ns

SYSTEM AND METHOD FOR AUTOMATICALLY POPULATING APPOINTMENT FIELDS

BACKGROUND OF THE INVENTION

Cellular telephones, personal computers, stationary computers, mobile computers, and other computing devices are fast becoming mainstream modes for personal enjoyment, communication, and data manipulation. Typically, messaging in association with these devices requires data or text entry. As these modes of communication and messaging become more prevalent, so does the need for efficiency and usability of these services. Currently, messaging clients and appointment clients require a user to manually enter text in order to generate a message or appointment. Such text entry is inefficient and highly burdensome on the user, especially in situations where a keyboard is unavailable.

SUMMARY OF THE INVENTION

Aspects of the invention include a system and method for automatically populating appointment fields of an appointment template. Succinctly stated, aspects of the present invention include converting message field data into appointment field data so a user does not need to manually enter this information. For example, sender and recipient data associated with a message may automatically populate an "Attendees" field of an appointment template. Likewise, data associated with a "Subject" field, "Attach" field, and "Body" field of a message may automatically populate a "Subject" field, "Attach" field, and "Body" field of an appointment template. Population of an appointment template may be automatic or the user may set defaults for each of the fields.

In other aspects, appointment fields may be populated by databases apart from the message field data. Data associated with a scheduler may automatically populate fields of an appointment template. Time and place fields of an appointment template may be populated with non-conflicting time and place data in light of the scheduler. In this manner, a user of a mobile device (along with other computing device types) has an efficient manner of sending an appointment request in response to a message without the labor of manually inputting field data into an appointment template.

These and other aspects of the present invention will be evident in light of the disclosure set forth herein.

DETAILED DESCRIPTION

Embodiments of the present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure is enabling through embodiments that will convey the full scope of the invention to those of skill in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Embodiments of a System and Method for Automatically Populating Appointment Fields Succinctly stated, aspects of the present invention include a system and method for automatically populating appointment fields of an appointment template. One embodiment includes converting message field data into appointment field data. Aspects may include automatic population of appointment fields based on populated fields of a provided message. Other aspects include allowing a user to activate a default setting to determine the manner of field population of the appointment template. In other aspects, appointment fields may be populated by databases apart from the message field data. As one generalized example, a user may receive a message and view the message on a mobile device. The user may actuate a field populator to transfer the information in the message fields to appropriate fields of an appointment template. In this manner, a user of a mobile device (along with other computing device types) has an efficient manner of sending an appointment request in response to a message without the labor of manually inputting field data into an appointment template.

Aspects of the invention include any type of communication having fields conducive to populating an appointment field. For example, the message field data may include text-messaging data, instant messaging data, Short Messaging Service ("SMS") data or data generated from a voicemail message. Moreover, as more fully described below, aspects of the invention also include reverse operation. Stated another way, appointment field data may be used to populate message fields of a message template.

Figure 3:
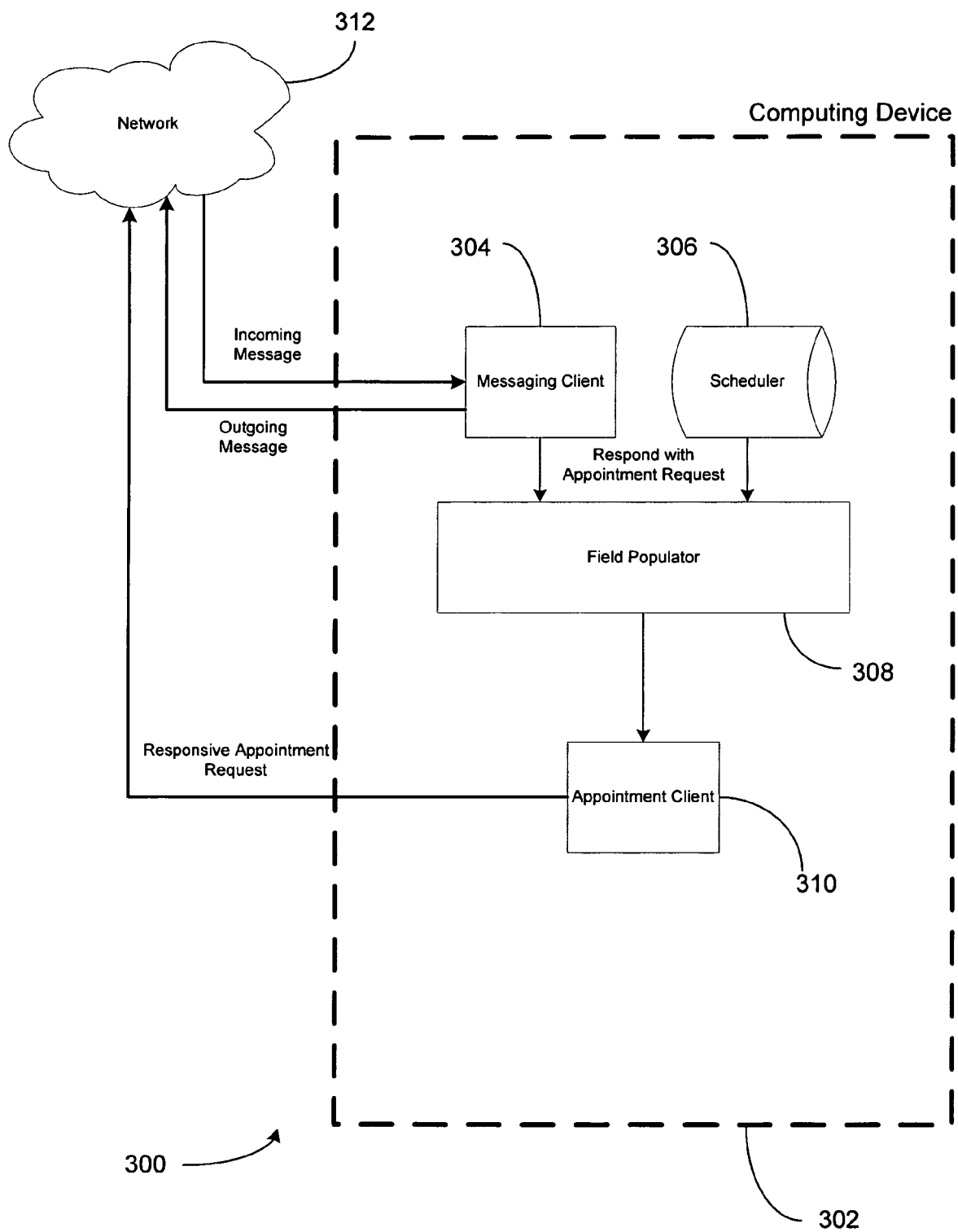
FIG. 3 represents one exemplary modular system that may be used in one embodiment of the present invention.

FIG. 3 represents one exemplary system 300 for automatically populating appointment fields of an appointment template. System 300 represents a modular overview of the present invention. System 300 may be integrated as a combination of software and hardware elements, an operating system or any combination thereof. Hardware, databases, software or applications referenced herein may be integrated as a single element or include various elements in communication with one another. Software and/or hardware elements are depicted herein for explanatory purposes only and not for limiting the configuration to multiple elements or a single element performing several functions. For example, in FIG. 3, computing device 302 may include messaging client 304, scheduler 306, field populator 308 and appointment client 310. Reference numbers 304-310 may include separate programs, separate databases and separate hardware. Reference numbers 304-310 may also include a single program or any combination of single and multiple programs. Also, system 300 may be included as one or more elements of an operating system.

Figure 1:
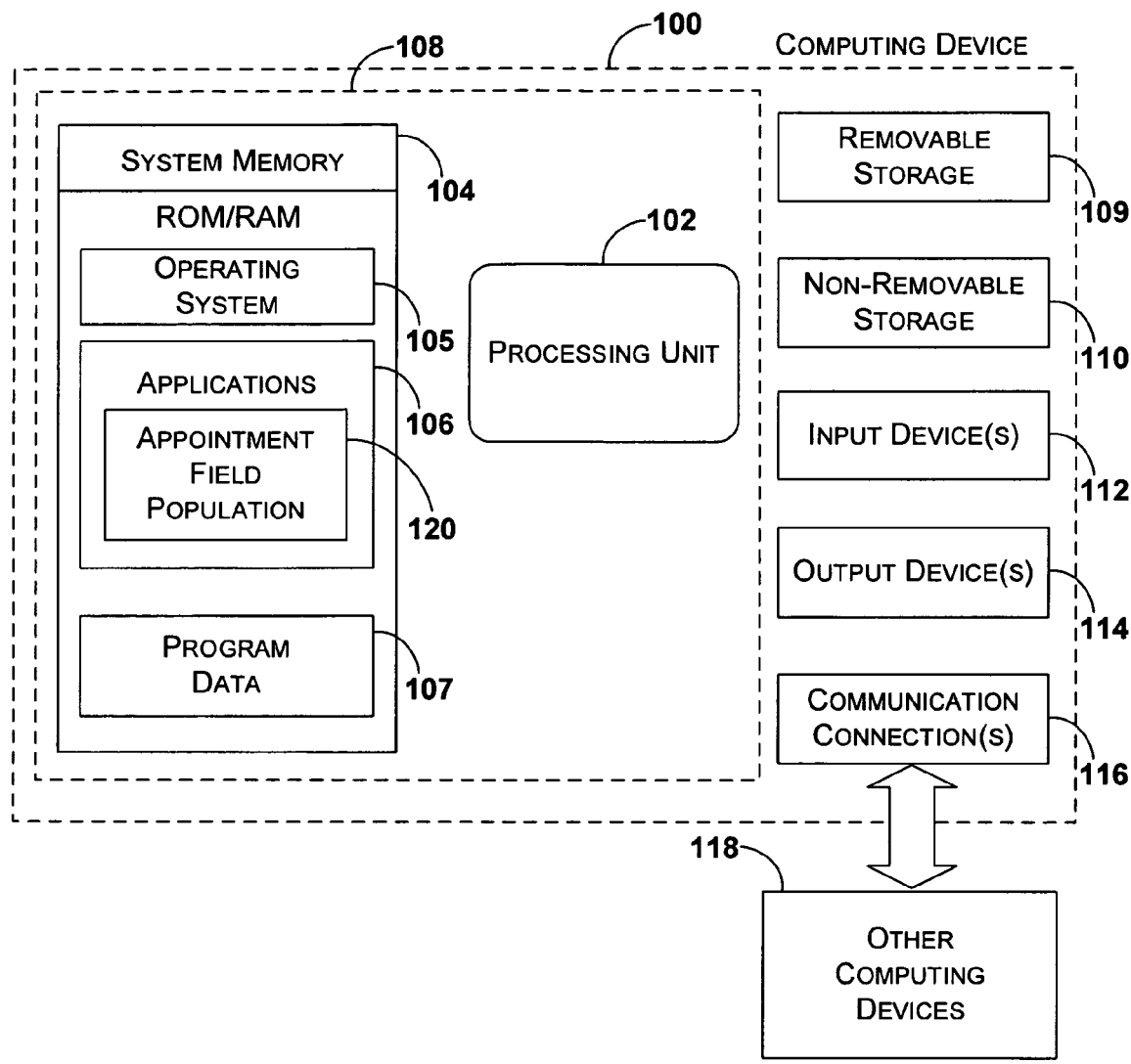
FIG. 1 illustrates an exemplary computing device that may be used in one aspect of the present invention.

Computing device 302 may include computing device 100 as exemplified in FIG. 1 or computing device 302 may include mobile computing device 200 as exemplified in FIG.

2. Computing device 302 may include a telephone, cellular telephone, satellite telephone, stationary computing device, mobile computing device, televising device, mobile audio device, watch device, or any other device that may implement messaging services. Computing device 302 may communicate with a network 312 so that the computing device may send and receive information via network 312. As will be more fully set forth below, FIG. 3 represents but one exemplary method of communication between network 312 and elements 304-310.

Messaging client 304 may include any type of messaging client configured to receive incoming messages from network 312 and transmit outgoing messages to network 312. For example, messaging client 304 may include a text-messaging client, an instant messaging client or a voicemail messaging client. In one embodiment, messaging client 304 may be represented by aspects of MICROSOFT OUTLOOK and/or MICROSOFT OUTLOOK EXPRESS from MICROSOFT CORPORATION, headquartered in Redmond, Wash.

Scheduler 306 may include a calendar, meeting and/or appointment type scheduler. For example, scheduler 306 may include one or more meeting times, appointment times, important dates, anniversaries, contacts, meeting places, room numbers, etc. In one aspect, scheduler 306 includes a plurality of scheduler databases of users connected to network 312. In this manner, scheduler 306 may have access to prior, current and future schedules of a plurality of contacts. In one embodiment, scheduler 306 may be represented by aspects of MICROSOFT OUTLOOK and/or MICROSOFT OUTLOOK EXPRESS from MICROSOFT CORPORATION, headquartered in Redmond, Wash.

As indicated in FIG. 3, in some situations when a user receives an incoming message, the user may want to respond to the incoming message with an appointment request. In such a situation, as will be further described in conjunction with FIG. 4, field populator 308 may associate data from messaging client 304, scheduler 306 and appointment client 310. As a succinct example of field populator 308, field populator 308 may link message field data associated with an incoming message to appointment fields of a responsive appointment request. As another example, field populator 308 may cut message field data associated with an incoming message and paste the message field data in an appropriate field of a responsive appointment request. Field populator 308 may also associate default time and place data with a responsive appointment request via scheduler 306.

Appointment client 310 may include any type of appointment client configured to receive field data and transmit a responsive appointment request to network 312. In another embodiment, appointment client 310 is configured to receive field data and transmit appointment information to a scheduler or a calendar application. In yet another embodiment, appointment client 310 may be represented by aspects of MICROSOFT OUTLOOK and/or MICROSOFT OUTLOOK EXPRESS from MICROSOFT CORPORATION, headquartered in Redmond, Wash.

The exchange of data represented in FIG. 3 may also be reversed. Stated another way, computing device 302 may receive an incoming appointment request. In some situations, when a user receives an incoming appointment request, the user may want to respond to the incoming appointment request with a message. In such a situation, field populator 308 may associate or link data from the appointment request fields to appropriate message fields in order to automatically populate a message template.

Figure 4:
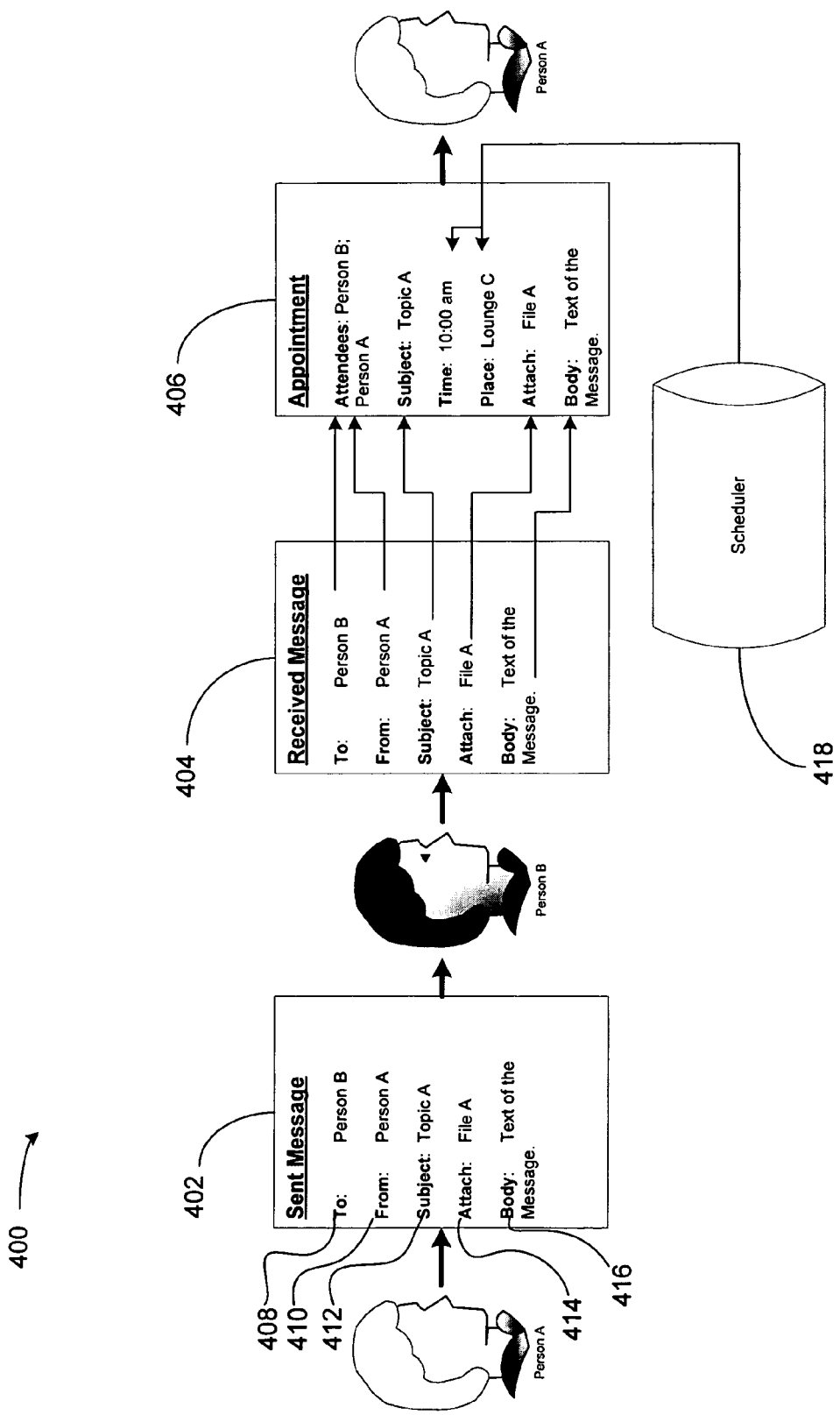
FIG. 4 represents an exemplary overview of one embodiment for automatically populating appointment fields.

FIG. 4 represents an exemplary overview of one embodiment for automatically populating appointment fields with field data of a message. System 400 includes person A and person B communicating by sent message 402, received message 404 and appointment 406. Person A may generate sent message 402 by populating the "To" field 408, "From" field 410, "Subject" field 412, "Attach" field 414 and "Body" field 416. Other fields may include a "carbon copy" field, a "blind carbon copy" field or any other field that may facilitate communication via a message.

After generating sent message 402, person A "sends" sent message 402 to person B. Person B "receives" received message 404. Received message 404 includes similar fields 408-416 as sent message 402. Person B may respond to received message 404 via an appointment 406. In such a situation, person B may actuate a field populator to transfer the field data of received message 404 to the fields of appointment 406. Person B may actuate the field populator by a hard button, icon, drop down menu, keystroke, or any other type of mechanical, electrical or software based actuator. Upon actuation, the field data of received message 404 is used to populate the fields of appointment 406. In another aspect, automatic field population does not require manual actuation.

FIG. 4 represents but one example of field population. For example, "Person A" and "Person B" associated with the received message may populate the "Attendees" field of appointment 406. Likewise, data associated with the "Subject" field, "Attach" field, and "Body" field of received message 404 may populate the "Subject" field, "Attach" field, and "Body" field of appointment 406. Population of appointment 406 may be automatic or the user may set defaults for each of the fields. For example, the user may set a default that does not transfer attachments from received message 404 to appointment 406. As another example, the user may set a default that associates the subject field of received message 404 with the body field of appointment 406.

Data associated with scheduler 418 may also automatically populate fields of appointment 406. Scheduler 418 may include data associated with Person A and Person B. Such data may include scheduling information, prior meeting places, prior meeting rooms, prior meeting times, unavailability times, future appointments, etc. Time and place fields of appointment 406 may be populated with a non-conflicting time and place in light of scheduler 418. In another aspect, person B may manually populate time and place fields of appointment 406.

The exchange of data in FIG. 4 may also be reversed. Stated another way, person A may generate an appointment and send the appointment to person B. Person B may respond to the received appointment by a message. When a field populator is actuated, field data of the appointment may populate appropriate fields of a message.

Figure 5:
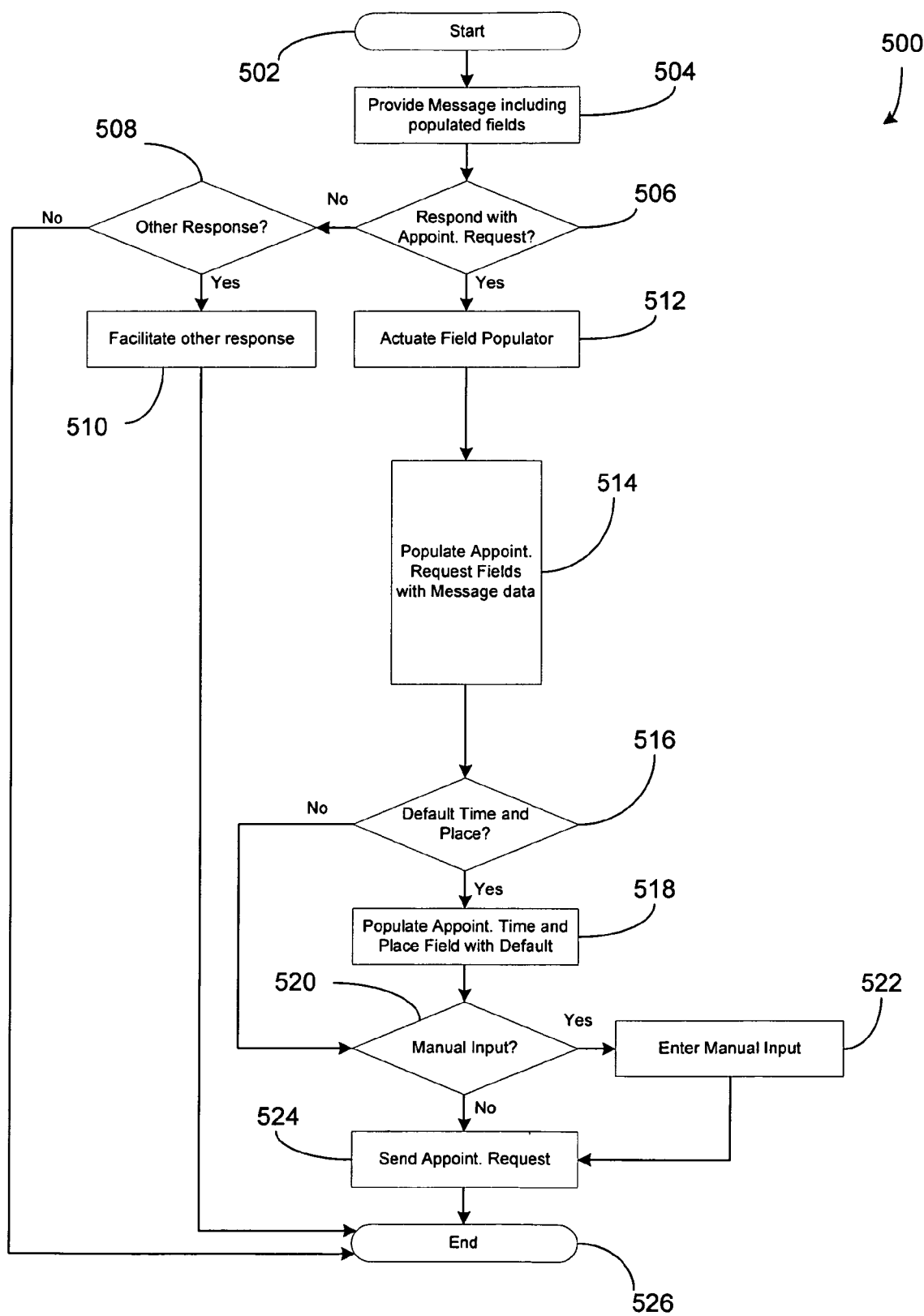
FIG. 5 represents an exemplary logical flow diagram of one embodiment for automatically populating appointment fields.

FIG. 5 represents a logical flow diagram of one embodiment of automatically populating appointment fields of an appointment template. Process 500 starts at starting block 502 and flows to block 504 where a message having populated fields is provided. Such a message may include an e-mail message, a text message, an instant message, an SMS message, a message generated from voicemail or any other message associated with populated fields. The message may be provided via a network or the message may be internal to a computing device.

At decision block 506, process 500 determines whether to respond to the message with an appointment request. When a response by an appointment request is not implemented, process 500 flows to decision block 508, where process 500 determines whether another type of response is required. Process 500 flows to end block 526 when a response is not required. When a response is required, process 500 flows to block 510, where an appropriate response is facilitated. The response may include a correlative e-mail response, a text message response, an instant message response, a SMS message response, a response generated from voicemail or any other type of appropriate response depending on the provided message. Once the response is facilitated, process 500 flows to end block 526.

When, at decision block 506, a response with an appointment request is implemented, process 500 flows to block 512. At block 512 a field populator may be actuated. Actuation may include a hard button, icon, drop down menu, keystroke, or any other type of mechanical, electrical or software-based actuator used to actuate a function. In another aspect, actuation of the field populator function is automatic. Process 500 then flows to block 514.

At block 514, process 500 populates appointment request fields with appropriate data from the message fields. For example, "To" and "From" data associated with the message may populate the "Attendees" field of an appointment request. Likewise, data associated with the "Subject" field, "Attach" field, and "Body" field of the message may populate the "Subject" field, "Attach" field, and "Body" field of the appointment request. Other fields that may be populated include a carbon copy field, a blind carbon copy field or any other field that may facilitate communication via a message. In one aspect, block 514 includes linking message field data associated with an incoming message to appointment fields associated with a responsive appointment request. In another aspect, block 514 includes automatically cutting message field data associated with an incoming message and automatically pasting the message field data in an appropriate field of a responsive appointment request.

At decision block 516, process 500 determines whether a default time and place are available. If a default time and place are not available, process 500 continues to block 520 as more fully set forth below. A default time and place may be indicated by a user selection of a default time and place. In another aspect, a default time and place are determined in light of scheduler data. Time and place fields may be populated with a non-conflicting time and place of the parties to the appointment. In such a situation, process 500 flows to block 518 where time and place fields of the appointment are populated.

At decision block 520, process 500 determines whether a manual input is required. A manual input may be required where a field is not populated by default or via message field data. When a manual input is required, the input may be entered into the field as indicated by block 522. The process then flows to block 524 where the message is sent and process 500 ends at end block 526. When manual input is not required, process 500 continues to blocks 524 and 526 as previously stated.

Illustrative Operating Environment

Referring to FIG. 1, an exemplary system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes operating system 105, one or more applications 106, and may include program data 107. In one embodiment, applications 106 further include application 120 for appointment field population. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as a keyboard, mouse, pen, voice input device, touch input device, etc. Output device(s) 114 such as a display, speakers, printer, etc. may also be included. All these devices are known in the art and need not be discussed at length here.

Computing device 100 also contains communication connection(s) 116 that allow the device to communicate with other computing devices 118, such as over a network or a wireless mesh network. Communication connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
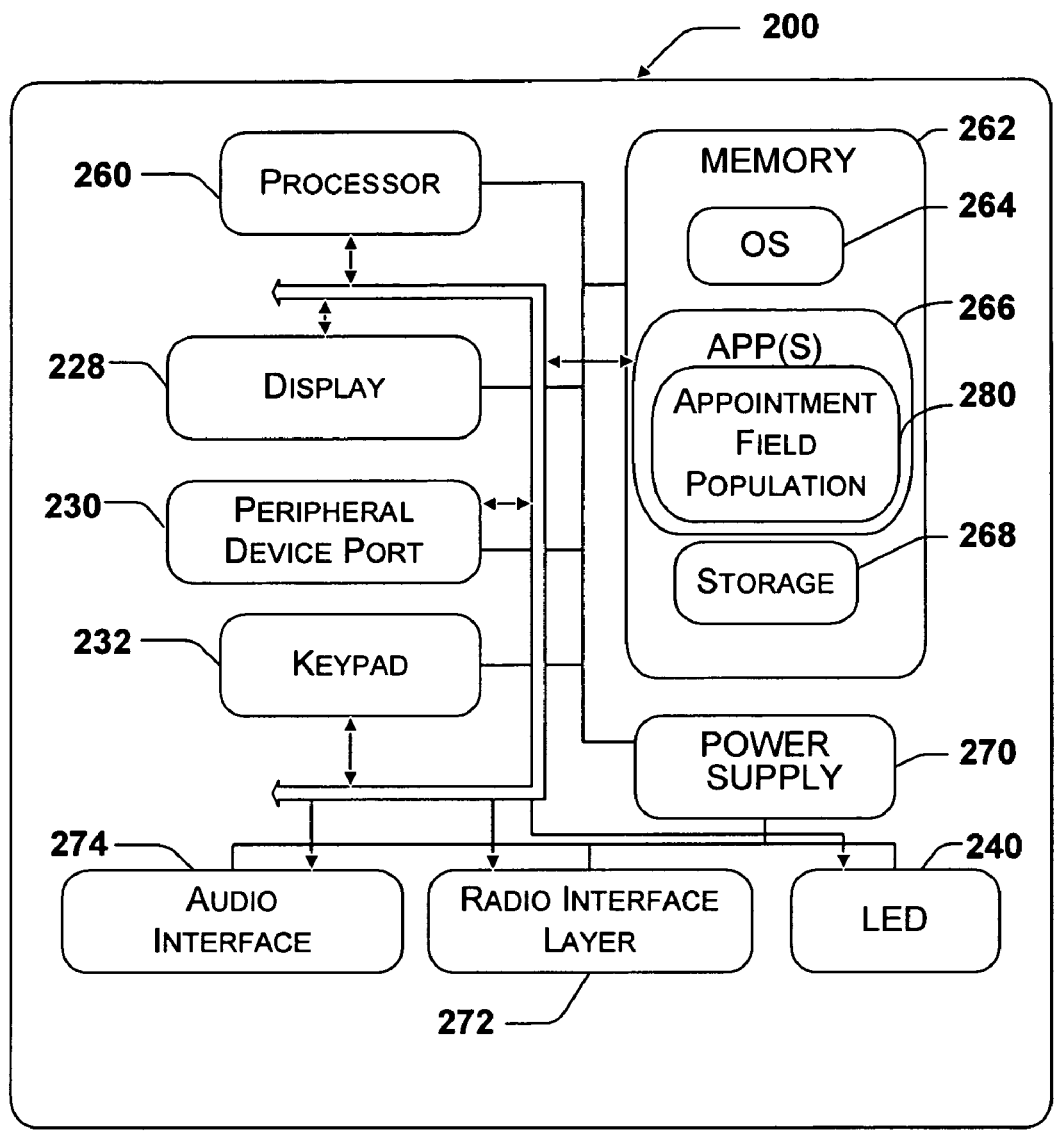
FIG. 2 illustrates an exemplary mobile device that may be used in one aspect of the present invention.

FIG. 2 illustrates a mobile computing device that may be used in one exemplary embodiment of the present invention. With reference to FIG. 2, one exemplary system for implementing the invention includes a mobile computing device, such as mobile computing device 200. The mobile computing device 200 has processor 260, memory 262, display 228, and keypad 232. Memory 262 generally includes both volatile memory (e.g., RAM) and non-volatile memory (e.g., ROM, Flash Memory, or the like). Mobile computing device 200 includes operating system 264, which is resident in memory 262 and executes on processor 260. Keypad 232 may be a push button numeric dialing pad (such as on a typical telephone), or a multi-key keyboard (such as a conventional keyboard). Display 228 may be a liquid crystal display, or any other type of display commonly used in mobile computing devices. Display 228 may be touch-sensitive, and would then also act as an input device.

One or more application programs 266 are loaded into memory 262 and run on operating system 264. Examples of application programs include phone dialer programs, e-mail programs, scheduling programs, PIM (personal information management) programs, word processing programs, spreadsheet programs, Internet browser programs, and so forth. Mobile computing device 200 also includes non-volatile storage 268 within memory 262. Non-volatile storage 268 may be used to store persistent information which should not be lost if mobile computing device 200 is powered down. Applications 266 may use and store information in storage 268, such as e-mail or other messages used by an e-mail application, contact information used by a PIM, appointment information used by a scheduling program, documents used by a word processing application, and the like. In one embodiment, applications 266 further include application 280 for appointment field population.

Mobile computing device 200 has power supply 270, which may be implemented as one or more batteries. Power supply 270 might further include an external power source, such as an AC adapter or a powered docking cradle that supplements or recharges the batteries.

Mobile computing device 200 is shown with two types of external notification mechanisms: LED 240 and audio interface 274. These devices may be directly coupled to power supply 270 so that when activated, they remain on for a duration dictated by the notification mechanism even though processor 260 and other components might shut down to conserve battery power. LED 240 may be programmed to remain on indefinitely until the user takes action to indicate the powered-on status of the device. Audio interface 274 is used to provide audible signals to and receive audible signals from the user. For example, audio interface 274 may be coupled to a speaker for providing audible output and to a microphone for receiving audible input, such as to facilitate a telephone conversation.

Mobile computing device 200 also includes radio interface layer 272 that performs the function of transmitting and receiving communications, such as radio frequency communications. Radio interface layer 272 facilitates wireless connectivity between mobile computing device 200 and the outside world, via a communications carrier or service provider. Transmissions to and from radio interface layer 272 are conducted under control of operating system 264. In other words, communications received by radio interface layer 272 may be disseminated to application programs 266 via operating system 264, and vice versa.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for automatically populating appointment fields of a meeting request with data from a received message, the method comprising:
   receiving a message that includes a recipient identifier, a sender identifier, an attachment, subject text and body text;
   receiving a single input to actuate a field populator;
   automatically generating a meeting request template, wherein the field populator automatically:
      populates an attendees field of the meeting request template with the recipient identifier and the sender identifier of the message,
      populates a subject field of the meeting request template with the subject text of the message,
      populates a body field of the meeting request template with the body text of the message,
      determines whether a default for indicating that attachments should not be transferred from the message to the meeting request template has been set;
      in response to determining that the default for indicating that attachments should not be transferred from the message to the meeting request template has not been set, populates an attachment field of the meeting request template with the attachment of the message;
      populates a time field of the meeting request template with a non-conflicting time indicated by a scheduler database in light of at least one prior meeting time associated with the sender and the recipient, and
      populates a place field of the meeting request template with a non-conflicting place indicated by the scheduler database in light of at least one prior meeting place associated with the sender and the recipient.

2. The computer-implemented method of claim 1, further comprising populating the time field of the meeting request template with a default time when a non-conflicting time is not indicated by the scheduler database.

3. The computer-implemented method of claim 1, further comprising populating the place field of the meeting request template with a default place when a non-conflicting place is not indicated by the scheduler database.

4. The computer-implemented method of claim 1, wherein the field populator automatically populates the body field of the meeting request template with the subject text of the message.

5. The computer-implemented method of claim 1, wherein the field populator populates fields of the meeting request template by a copy/paste operation.

6. The computer-implemented method of claim 1, wherein the field populator populates fields of the meeting request template by a linking operation.

7. The computer-implemented method of claim 1, wherein the scheduler database includes at least one member of a group comprising: scheduling information, prior meeting places, prior meeting rooms, prior meeting times, unavailable times, and future appointments.

8. A computer-readable storage medium having computer executable instructions for automatically populating appointment fields of a meeting request with data from a received message, the instructions comprising:
   receiving a message that includes a recipient identifier, a sender identifier, subject text, at least one attachment, and body text;
   receiving an input to actuate a field populator;
   automatically generating a meeting request template, wherein the field populator automatically:
      populates an attendees field of the meeting request template with the recipient identifier and the sender identifier of the message,
      populates a subject field of the meeting request template with the subject text of the message,
      populates a body field of the meeting request template with the body text of the message,
      determines whether a default for indicating that attachments should not be transferred from the message to the meeting request template has been set;
      in response to determining that the option for indicating that attachments should not be transferred from the message to the meeting request template has not been set, populates an attachment field of the meeting request template with the at least one attachment of the message;
      populates a time field of the meeting request template with a non-conflicting time indicated by a scheduler database based on at least one prior meeting time associated with the sender and the recipient, and populates a place field of the meeting request template with a non-conflicting place indicated by the scheduler database based on at least one prior meeting place associated with the sender and the recipient.

9. The computer-readable storage medium of claim 8, wherein the field populator automatically determines whether the recipient of the message has set a default indicator for automatic population of attachments, wherein an attachment field of the meeting request template is populated with the attachment of the message when the default indicator provides automatic population of attachments, wherein the attachment field of the meeting request template is not populated with the attachment of the message when the default indicator does not provide automatic population of attachments.

10. The computer-readable storage medium of claim 8, further comprising populating the time field of the meeting request template with a default time when a non-conflicting time is not indicated by the scheduler database.

11. The computer-readable storage medium of claim 8, further comprising populating the place field of the meeting request template with a default place when a non-conflicting place is not indicated by the scheduler database.

12. The computer-readable storage medium of claim 8, wherein the field populator automatically populates the body field of the meeting request template with the subject text of the message.

13. The computer-readable storage medium of claim 8, wherein the field populator populates fields of the meeting request template by a copy/paste operation.

14. The computer-readable storage medium of claim 8, wherein the field populator populates fields of the meeting request template by a linking operation.

15. A system for automatically populating appointment fields of a meeting request with data from a received message, the instructions comprising:
   a processor;
   a memory;
   an appointment client stored in the memory and configured to generate a meeting request template;
   a messaging client stored in the memory and configured to receive a message that includes a recipient identifier, a sender identifier, subject text and body text;
   a field populator stored in the memory that is configured to receive a user input and upon receiving the user input:
      populate an attendees field of the meeting request template with the recipient identifier and the sender identifier of the message,
      populate a subject field of the meeting request template with the subject text of the message,
      populate a body field of the meeting request template with the body text of the message,
      determines whether a default for indicating that attachments should not be transferred from the message to the meeting request template has been set;
      in response to determining that the option for indicating that attachments should not be transferred from the message to the meeting request template has not been set, populates an attachment field of the meeting request template with the attachment of the message;
      populate a time field of the meeting request template with a determined non-conflicting time indicated by a scheduler database based on at least one prior meeting time associated with the sender and the recipient, and
      populate a place field of the meeting request template with a determined non-conflicting place indicated by the scheduler database based on at least one prior meeting time associated with the sender and the recipient; and
   transmit the time and place information used to populate the time field and the place field of the meeting request template to the scheduler database.

16. The system of claim 15, further comprising populating the time field of the meeting request template with a default time when a non-conflicting time is not indicated by the scheduler database.

17. The system of claim 15, further comprising populating the place field of the meeting request template with a default place when a non-conflicting place is not indicated by the scheduler database.

18. The system of claim 15, wherein the field populator is further configured to populate the body field of the meeting request template with the subject text of the message.

19. The system of claim 15, wherein the field populator populates fields of the meeting request template by a copy/paste operation.

* * * * *